United States Patent
Sun et al.

(10) Patent No.: US 8,661,533 B2
(45) Date of Patent: Feb. 25, 2014

(54) METHOD FOR RESOURCE AND ADMISSION CONTROL

(75) Inventors: Mo Sun, Shenzhen (CN); Jun Song, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 790 days.

(21) Appl. No.: 12/863,599

(22) PCT Filed: Jun. 6, 2008

(86) PCT No.: PCT/CN2008/071227
§ 371 (c)(1),
(2), (4) Date: Jul. 20, 2010

(87) PCT Pub. No.: WO2009/094869
PCT Pub. Date: Aug. 6, 2009

(65) Prior Publication Data
US 2010/0287612 A1    Nov. 11, 2010

(30) Foreign Application Priority Data

Jan. 23, 2008    (CN) .............................. 200810004719

(51) Int. Cl.
  G06F 7/04      (2006.01)
  G06F 12/00     (2006.01)
  G06F 12/14     (2006.01)
  G06F 13/00     (2006.01)
  G06F 17/30     (2006.01)
  G06C 7/00      (2006.01)

(52) U.S. Cl.
  USPC ............................................ 726/21; 713/193

(58) Field of Classification Search
  USPC ...................... 370/329, 230, 352, 468; 726/21
  See application file for complete search history.

(56) References Cited

U.S. PATENT DOCUMENTS

2007/0162599 A1    7/2007 Nguyen
2007/0162909 A1    7/2007 Bahl et al.
(Continued)

FOREIGN PATENT DOCUMENTS

CN    1469585 A    1/2004
CN    1832447 A    9/2006
(Continued)

OTHER PUBLICATIONS

Ludmila Cherkasova; Session-Based Admission Control: A Mechanism for Peak Load Management of Commercial Web Sites; Jun., 2002; IEEE; vol. 51, No. 6; pp: 669-685.*

(Continued)

*Primary Examiner* — Mohammad W Reza
*Assistant Examiner* — Monjour Rahim
(74) *Attorney, Agent, or Firm* — Oppedahl Patent Law Firm LLC

(57) ABSTRACT

The present invention discloses a method for resource and admission control, which relates to the communication field. The method of the present invention includes the following steps: during the process of the service authorization of resource and admission control in the PULL mode, the policy decision function entity (PD-FE) performs the QoS resource authorization for the service request, then informs the authorization information of the authorized service flow to the Policy Execute Function Entity (PE-FE); after the PE-FE receives the authorization information, the association relationship between the PD-FE and the authorization information of the authorized service flow is established; during the process of resource reservation of the authorized service flow initiated by the Customer Premises Equipment (CPE), the PE-FE selects the PD-FE according to the above mentioned corresponding relationship, and interacts with the PD-FE. The method of the present invention enables PE-FE or TRC-FE to select to implement the process of resource reservation request for the is PD-FE authorized by the service flow that initiates the resource reservation request, after receiving the resource reservation request of the service flow.

15 Claims, 8 Drawing Sheets

(56) References Cited

U.S. PATENT DOCUMENTS

| | | | |
|---|---|---|---|
| 2007/0189274 A1* | 8/2007 | Liu | 370/352 |
| 2007/0248106 A1 | 10/2007 | Liu | |
| 2008/0130574 A1* | 6/2008 | Nam et al. | 370/331 |
| 2008/0144494 A1* | 6/2008 | Casey | 370/230 |
| 2009/0154494 A1* | 6/2009 | Wang | 370/468 |
| 2010/0272053 A1* | 10/2010 | You et al. | 370/329 |

FOREIGN PATENT DOCUMENTS

| | | |
|---|---|---|
| CN | 1832448 A | 9/2006 |
| CN | 1832449 A | 9/2006 |
| EP | 1858211 A1 | 11/2007 |
| KR | 20050067948 A | 7/2005 |

OTHER PUBLICATIONS

International Search Report on international application No. PCT/CN2008/071227, mailed on Sep., 2008.

English Translation of the Written Opinion of the International Search Authority in international application number: PCT/CN2008/071227, mailed on Sep., 2008.

Resource and admission control functions in next generation networks, Sep. 2006.

Resource and admission control in NGN, Mar. 2007.

Protocol at the interface between a policy decision physical entity (PE-PE) and a policy enforcement physical entity (PE-PE) (RW interface): overview; Nov. 2007.

Overview of ITU-T NGN QoS control, Sep. 2007.

* cited by examiner

METHOD FOR RESOURCE AND ADMISSION CONTROL

TECHNICAL FIELD

The present invention relates to the communication field, and more specifically to a method for resource and admission control in the NGN (Next Generation Network).

BACKGROUND

In the NGN, because the carrier network adopts the packet technology, in particular the IP (Internet Protocol) technology, the problems of QoS (Quality of Service) become especially outstanding. The ITU (International Telecommunication Union) has proposed that using the RACF (Resource and Admission Control Function) to solve the QoS problems in NGN carrier networks.

The major function of RACF is to perform resource and admission control based on the user subscription QoS information and available resources in the network, according to operation policies and rules. The RACF blocks the differences of the carrier layer for the application layer and maps the QoS attributes of the application layer to the carrier is layer so that the carrier layer transmission entity can provide QoS assurance for the media flow of the session under its directing. The RACF is comprised of two parts which are the Policy Decision Function Entity (PD-FE) and the Transport Resource Control Function Entity (TRC-FE).

In ITU's latest RACF draft, the functional architecture of the RACF from ITU-T (International Telecommunication Union-Telecom) is shown in FIG. 1.

The PD-FE makes a preliminary QoS resource decision based on the media flow session information acquired from the Service Control Function (SCF) entity through the Rs interface and the user's transmission resource subscription information acquired from the Network Attachment Control Function (NACF) entity through the Ru interface, then interacts with TRC-FE to determine whether there are sufficient QoS resources, and finally makes a final decision and sends the final decision down to the Policy Execute Function Entity (PE-FE) for execution.

The TRC-FE is mainly responsible for resource control. The TRC-FE monitors the resources in the network and collects the related information, and responds according to the specific resource conditions when the PD-FE requests resources.

The PE-FE performs policy control (gate control, bandwidth, traffic classification and tagging, traffic shaping, QoS mapping of Layer 2 and Layer 3, and collecting and reporting resource usage information, etc) primarily under the direction of PD-FE.

The Transport Resource Execute Function Entity (TRE-FE) protocol performs Layer 2 policy execution related to the transmission technology under the direction of TRC-FE according to the current description, but neither the specific functions nor the scope has been determined.

Currently, RACF's resource and admission control mode is classified into two QoS resource control modes, i.e. PUSH and PULL, to adapt to different Customer Premises Equipments (CPEs).

Wherein, the PULL mode refers to the service that SCF requests RACF to perform is QoS resource authorization and resource reservation for the service initiated by CPE and the transmission layer function entity actively requests RACF for a decision when receiving a transmission layer QoS signaling message. The mode is mainly comprised of three processes, i.e. Authorization, Reservation and Commitment, where the latter two processes can generally be combined into a single process.

FIG. 2 illustrates the authorization process in the PULL mode, which specifically includes the following:

(201) A SCF activates the QoS authorization process after receiving the service establishment signaling message.

(202) The SCF requests an authorization for the service by sending a resource initialization request message to a PD-FE.

(203) The PD-FE performs QoS resource authorization for the service request.

Herein, the PD-FE can assign an authorization token to the session, the authorization token may subsequently be carried by the CPE when initiating the resource reservation request and be used for bundling the service flow and the session; the quintuple method can be used to perform identification and bundling if no authorization token is assigned.

(204) The PD-FE replies a resource initialization response to the SCF.

If an authorization token has been assigned, the authorization token would be carried in the response.

(205) The SCF continues service signaling negotiation with a CPE, the SCF would return the authorization token to the CPE through signaling if the PD-FE in the RACF returns an authorization token.

After the authorization process, and after passing the signaling negotiation of QoS through the service layer, the CPE may initiate the resource reservation request process, which involves two situations, one is that the CPE initiates a request through the PE-FE, and the other is that the CPE initiates a request through the local TRC-FE residing in the is transmission layer function entity.

An illustration of the former is as shown in FIG. 3, the CPE first performs service signaling negotiation with the SCF, and after the QoS authorization is performed by the RACF, the CPE may initiate a resource reservation request through the transmission layer signaling, and activate the PE-FE of the transmission layer function entity to initiate a resource reservation request to the PD-FE.

An illustration of the latter is as shown in FIG. 4, the CPE first performs service signaling negotiation with the SCF, and after the QoS authorization is performed by the RACF, the CPE may initiate a resource reservation request through the transmission layer signaling, and activate the local TRC-FE residing in the transmission layer function entity to initiate a resource reservation request to its upper layer TRC-FE, i.e. the TRC-FE of the carrier control layer; after checking the available resources to ensure that they can meet the request, the upper layer TRC-FE may then request a resource and admission decision from the PD-FE.

Among existing methods for resource and admission control of the PULL mode, because multiple PD-FEs may exist based on different service scenarios, there are multiple-to-one and one-to-multiple scenarios between PE-FEs, the carrier control layer TRC-FE and PD-FE, as shown in the networking illustration in FIG. 5. In this case, the PE-FE or carrier control layer TRC-FE can not figure out which PD-FE has authorized the service flow that initiated the resource reservation request, thereby can not select the exact PD-FE to implement the resource reservation request process, after receiving the resource reservation request.

Therefore, it is necessary to improve the existing PULL mode based method for resource and admission control so as to solve this problem.

SUMMARY

The technical problem that the present invention intends to resolve is providing a method for resource and admission control, wherein after receiving the resource reservation request, the PE-FE or the carrier control layer TRC-FE can select the corresponding PD-FE to implement the resource reservation request process.

In order to resolve the above mentioned problem, the present invention provides a method for resource and admission control, which includes the following steps:

during the process of service authorization process of resource and admission control in the PULL mode, a policy decision function entity (PD-FE) performs QoS resource authorization for the service request, then the PD-FE informs the authorization information of the authorized service flow to a Policy Execute Function Entity (PE-FE);

after the PE-FE receives the authorization information, the association relationship between the PD-FE and the authorization information of the authorized service flow is established;

during the process of resource reservation of the authorized service flow initiated by the Customer Premises Equipment (CPE), the PE-FE selects the PD-FE according to the above mentioned corresponding relationship, and interacts with the PD-FE.

Furthermore, in the above mentioned method, the PD-FE may adopt the quintuple method to bundle the service flow and session, and the authorization information of the service flow sent down by the PD-FE may be the quintuple information of the authorized service flow;

after the PE-FE receives the authorization information, the corresponding relationship between the quintuple information of the authorized service flow and the PD-FE may be established, and a corresponding PD-FE may be selected during the resource reservation process according to the quintuple information of the authorized service flow in the resource reservation request sent by the Customer Premises Equipment (CPE).

Furthermore, in the above mentioned method, the PD-FE may assign a unique authorization token to each authorized service flow and ultimately send the authorization token to the Customer Premises Equipment (CPE), and the authorization information may be the authorization token of the authorized service flow;

after receiving the authorization information, the PE-FE may establish the corresponding relationship between the authorized service flow and the PD-FE according to the authorization token, and select the corresponding PD-FE during the resource reservation process according to the authorization token in the resource reservation request sent by the Customer Premises Equipment (CPE).

The present invention also discloses a method for resource and admission control, which includes the following steps:

during the process of service authorization of resource and admission control in the PULL mode, the policy decision function entity (PD-FE) performs authorization for the service request, then informs the authorization information of the authorized service flow to the Transport Resource Control Function Entity (TRC-FE);

after the TRC-FE receives the authorization information, the corresponding relationship between the PD-FE and the authorization information of the authorized service flow is established;

during the process of resource reservation of the authorized service flow initiated by the Customer Premises Equipment (CPE), the TRC-FE selects the PD-FE according to the above mentioned corresponding relationship, and interacts with the PD-FE.

Furthermore, in the above mentioned method, the PD-FE may adopt the quintuple method to bundle the service flow and the session, and the authorization information of the service flow passed down by the PD-FE may be the quintuple information of the authorized service flow;

after the TRC-FE receives the authorization information of the service flow, the corresponding relationship between the quintuple information of the authorized service flow and the PD-FE may be established, and the corresponding PD-FE may be selected during the resource reservation process according to the quintuple information of the authorized service flow in the resource reservation request sent by the Customer Premises Equipment (CPE).

Furthermore, in the above mentioned method, the PD-FE may assign a unique authorization token to each authorized service flow and ultimately send the authorization is token to the Customer Premises Equipment (CPE), and the authorization information may be the authorization token of the authorized service flow;

after receiving the authorization information, the TRC-FE may establish the corresponding relationship between the authorized service flow and the PD-FE according to the authorization token, and select the corresponding PD-FE during the resource reservation process according to the authorization token in the resource reservation request sent by the Customer Premises Equipment (CPE).

Wherein, the TRC-FE may be a carrier control layer TRC-FE; and the resource reservation process may include:

the Customer Premises Equipment (CPE) initiates a resource reservation request to the transmission layer function entity for the service flows;

the transmission layer function entity initiates a policy request to the carrier control layer TRC-FE through the local TRC-FE;

the carrier control layer TRC-FE checks the availability of resources, selects the PD-FE according to the corresponding relationship between the PD-FE and the authorization information, and initiates a resource reservation request to the PD-FE.

The present invention also discloses a method for resource and admission control, which includes the following steps:

during the process of service authorization of resource and admission control in the PULL mode, the Policy Decision Function Entity (PD-FE) may include its own identification information into the authorization token assigned to the authorized service flow, and ultimately send it to the Customer Premises Equipment (CPE);

during the process of resource reservation of the authorized service flow initiated by the Customer Premises Equipment (CPE), after receiving the resource reservation request, the Policy Execute Function Entity (PE-FE) may select the PD-FE according to the identification information of the PD-FE in the authorization token, and interact with the PD-FE.

Furthermore, in the above mentioned method, the identification information of the is PD-FE may contain the IP address of the PD-FE; or the identification information of the PD-FE may contain no IP address of the PD-FE, but a table of mapping relationships between the identification information of the PD-FEs and their IP addresses is configured over the PE-FE.

The present invention also discloses a method for resource and admission control, which includes the following steps:

during the process of service authorization of resource and admission control in the PULL mode, the Policy Decision Function Entity (PD-FE) may include its own identification information into the authorization token assigned to the authorized service flow, and ultimately send it to the Customer Premises Equipment (CPE);

during the process of resource reservation of the authorized service flow initiated by the Customer Premises Equipment (CPE), after receiving the resource reservation request, the Transport Resource Control Function Entity (TRC-FE) may select the PD-FE according to the identification information of the PD-FE in the authorization token of the resource reservation request, and interact with the PD-FE.

Furthermore, in the above mentioned method, the identification information of the PD-FE may be the IP address of PD-FE; or the identification information of the PD-FE may contain no IP address of PD-FE, but a table of mapping relationships between the identification information of the PD-FEs and their IP addresses may be configured over the TRC-FE.

Wherein, the TRC-FE may be a carrier control layer TRC-FE; during the process of resource reservation, after receiving the resource reservation request sent by the transmission layer, the carrier control layer TRC-FE of the may select the PD-FE according to the identification information of the PD-FE in the authorization token of the resource reservation request, and interact with the PD-FE.

Compared to existing technologies, the methods for resource and admission control of the present invention can be used to enable PE-FE or TRC-FE to select to implement the process of resource reservation request for the PD-FE authorized by the service flow is that initiates the resource reservation request, after receiving the resource reservation request of the service flow.

DETAILED DESCRIPTION

From analyzing the existing processes, it can be get that after receiving the resource reservation request, the PE-FE or carrier control layer TRC-FE can not figure out which PD-FE has authorized the service flow that initiated the resource reservation request, because the PD-FE has not informed the authorization information of the service flow to the PE-FE or carrier control layer TRC-FE during the service is authorization process prior to the resource reservation request. Therefore, in the present invention, during the process of service authorization of resource and admission control in the PULL mode, the PD-FE performs QoS authorization for the service flow, then informs the authorization information of the service flows to related PE-FE and/or TRC-FE, which then associate the authorization information of the service flow with the PD-FE; or, during the process of service authorization, the identification information of PD-FE are included into the authorization tokens. In this way, after receiving the subsequent resource reservation request from the transmission layer, the PE-FE or TRC-FE can select the exact PD-FE to interact with according to the above mentioned association relationship or the PD-FE identification information within the authorization token.

Wherein, the above mentioned TRC-FE generally means a carrier control layer TRC-FE. It is the carrier control layer TRC-FE that initiates a resource reservation request to the PD-FE, and the following descriptions are simply provided for the accomplishment of resource and admission control in such scenario. However, the present invention is not limited to such scenario; in other embodiments of the present invention, it can also be implemented by the TRC-FE of the transmission layer.

The present invention is further described in details below according to the attached drawings and specific embodiments.

Embodiment 1

Figure 1:
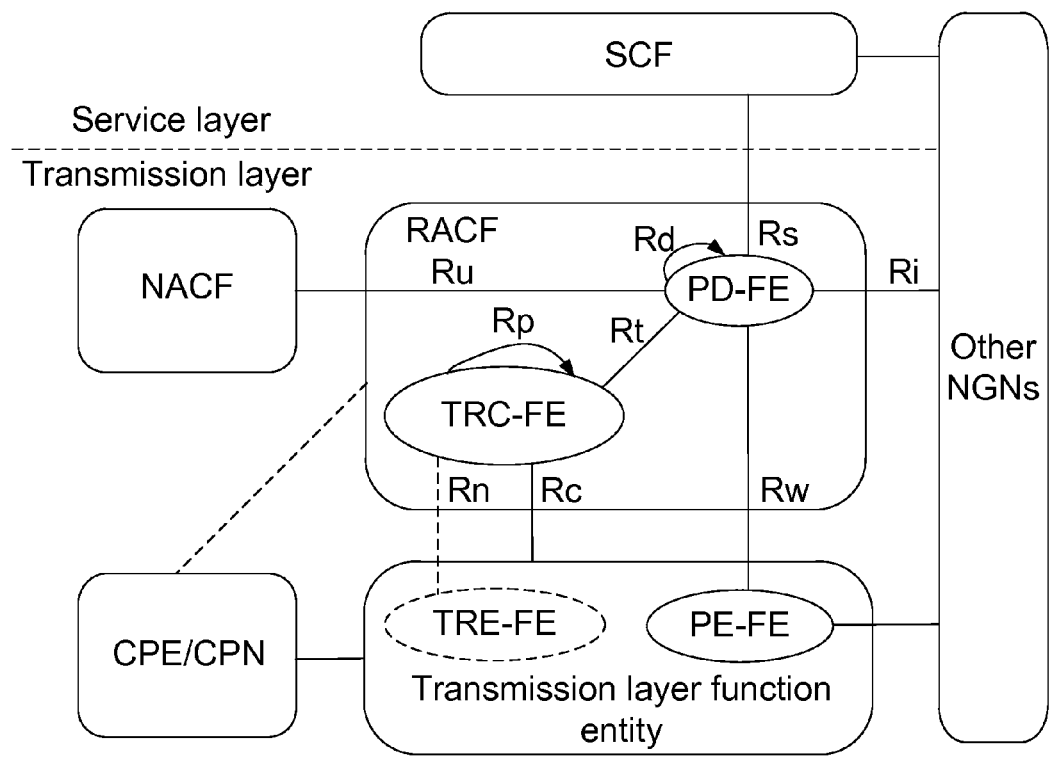
FIG. 1 is an architecture diagram of ITU-T's resource and admission control subsystem RACF.
Figure 2:
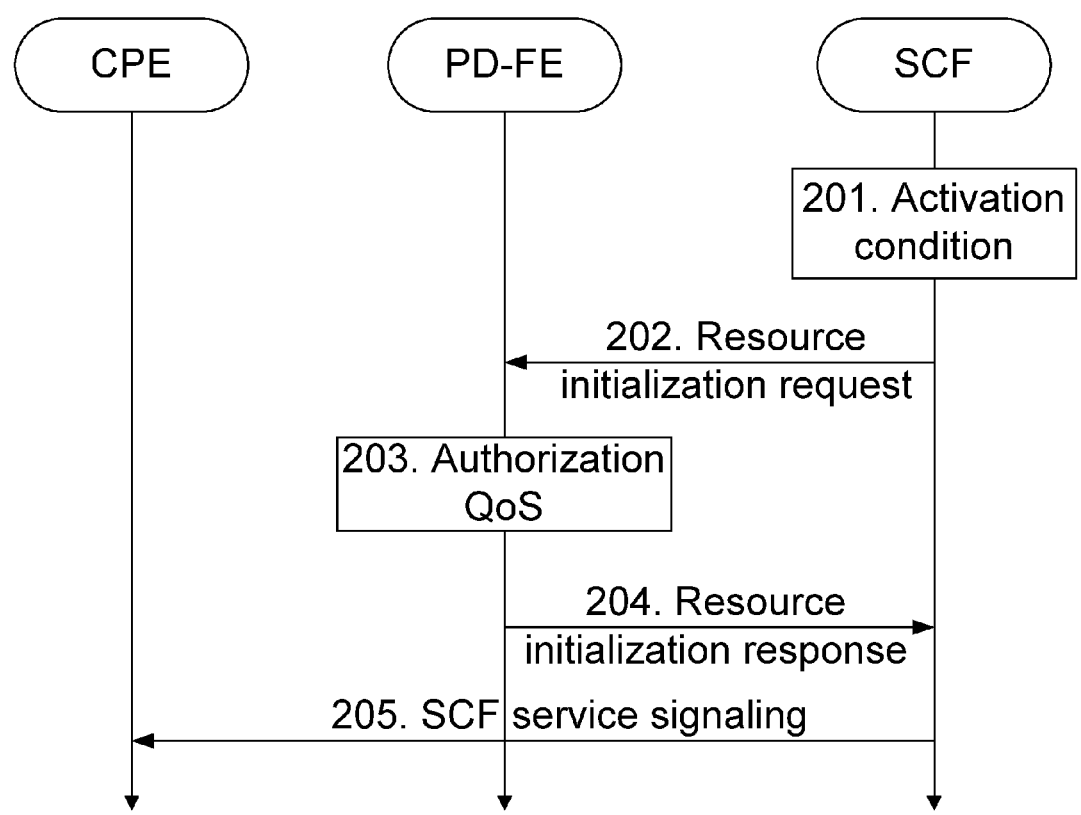
FIG. 2 is an illustration of the authorization process in the PULL mode according to the existing technology.
Figure 3:
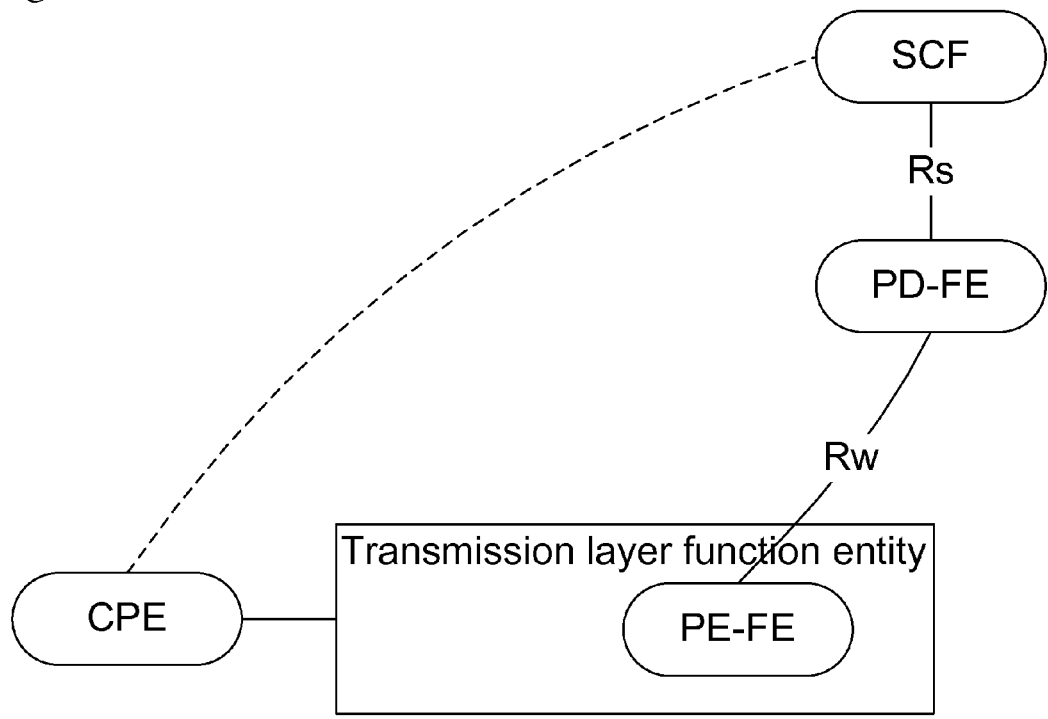
FIG. 3 is a networking illustration that CPE initiates a resource reservation request through PE-FE according to the existing technology.
Figure 4:
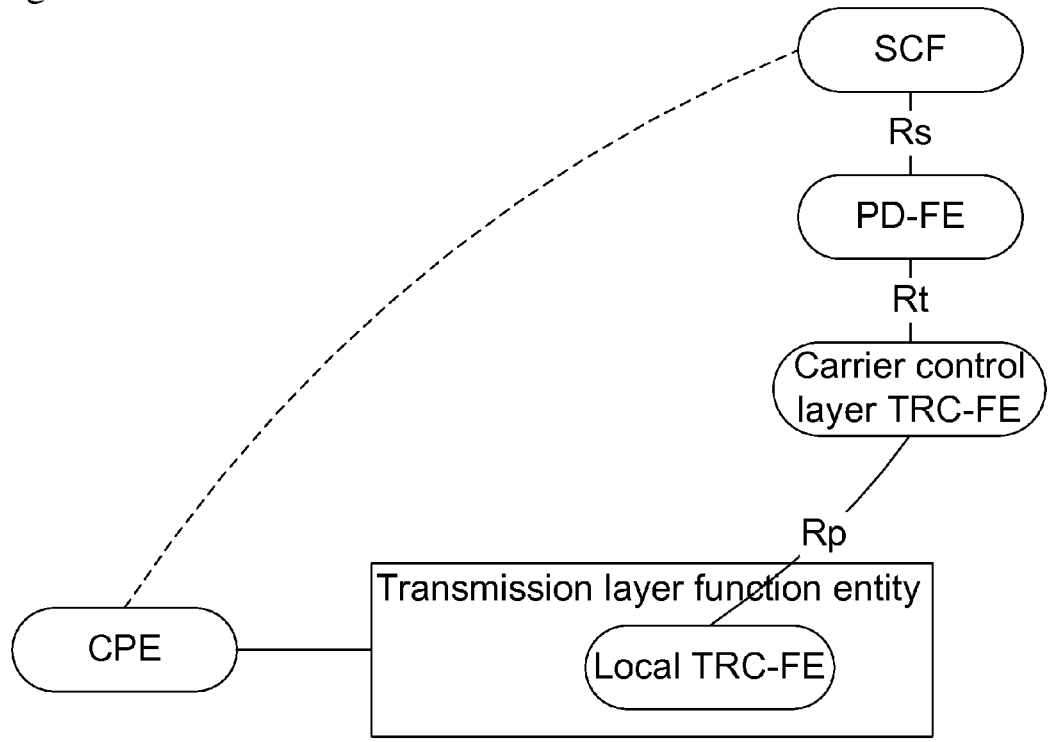
FIG. 4 is a networking illustration that CPE initiates a resource reservation request through the local TRC-FE according to the existing technology.
Figure 5:
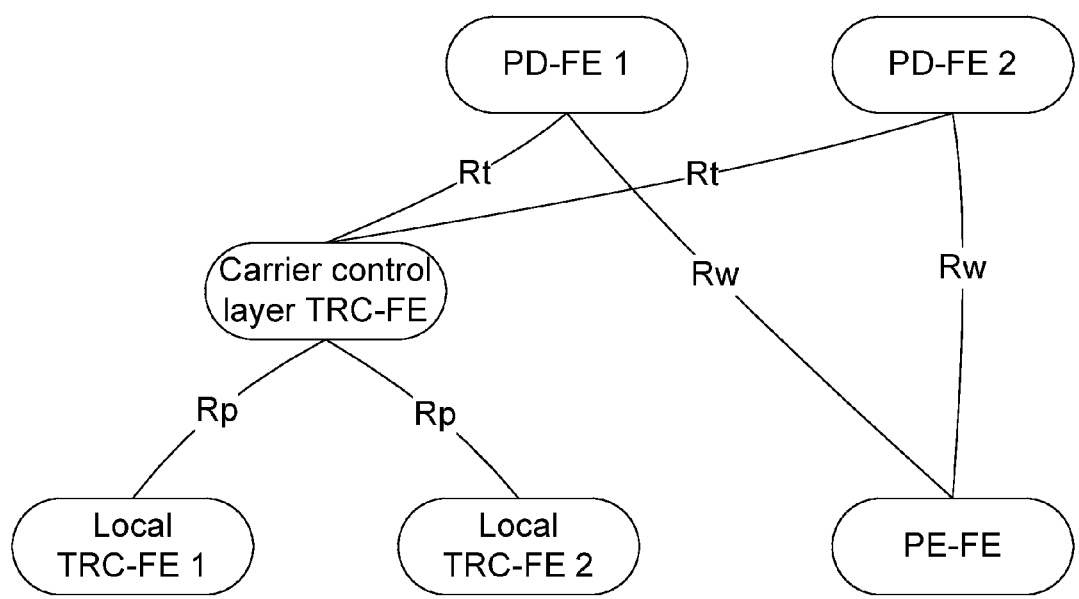
FIG. 5 is an illustration of different PD-FEs controlling the same PE-FE and carrier control layer TRC-FE according to the present invention.
Figure 6:
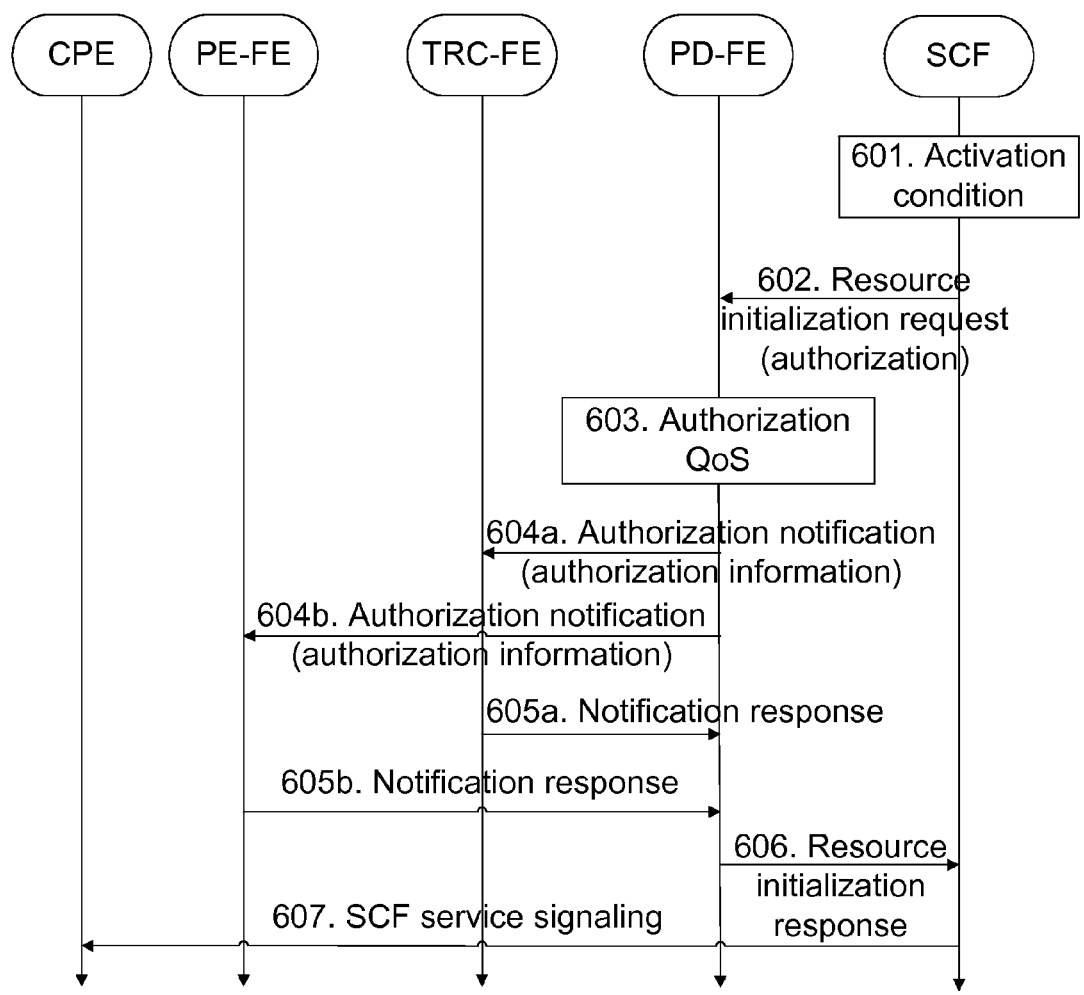
FIG. 6 is an illustration of the authorization process in the PULL mode according to the embodiment of the present invention.

As shown in FIG. 6, the service authorization process of this embodiment includes the following steps:

(601) The SCF activates the QoS authorization process after receiving the service establishment signaling message.

(602) The SCF requests an authorization for the service by sending a resource initialization message to PD-FE.

(603) The PD-FE performs the QoS resource authorization for the service request.

(604a, b) After authorizing the service request, the PD-FE sends an authorization notification message to the related PE-FEs (the service media flow may pass through several transmission layer network elements, and the PE-FEs residing over these network elements are the related PE-FEs for the service) and/or carrier control layer TRC-FE, to inform the authorization information of the service flow to the PE-FEs and/or carrier control layer TRC-FE.

After receiving the authorization notification message, the PE-FEs and carrier control layer TRC-FE associate the authorization information of the service flow with the PD-FE that has sent the notification message, and establish a table of corresponding relationships between PD-FEs and the authorization information of the service flows. The format of the table can be illustrated by the table below:

Table of corresponding relationships between PD-FEs and the authorization information of the service flows

| PD-FE 1 | Authorization information a |
| | Authorization information b |
| | Authorization information c |
| PD-FE 2 | Authorization information d |
| | Authorization information e |
| . . . | . . . |

The PE-FEs and carrier control layer TRC-FEs also need to maintain this table of corresponding relationship between PD-FEs and the authorization information of the service flows.

(605a, b) The PE-FEs and/or carrier control layer TRC-FEs that have received the notification reply a response to the PD-FE.

(606) The PD-FE replies a resource initialization response to the SCF.

(607) The SCF continues service signaling negotiation with the CPE.

Figure 7:
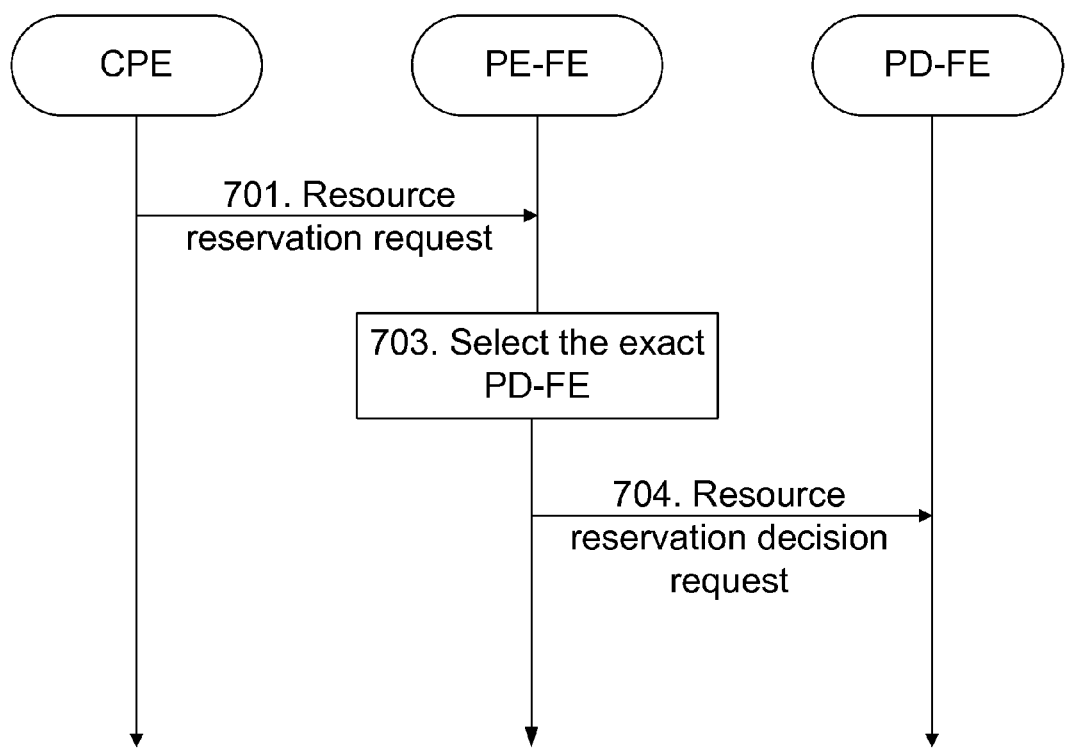
FIG. 7 is an illustration of the resource reservation handling process that CPE activates through PE-FE according to the embodiment in FIG. 6.

After the service request is authorized and after passing the service layer negotiation, the CPE may initiate the resource reservation process according to the QoS determined through service layer negotiation. The resource reservation process includes the following two situations:

If it is the resource reservation method activated through a PE-FE, the PE-FE may look up the maintained table of corresponding relationships between the PD-FEs and the authorization information of the service flows to find the exact PD-FE, then it can is implement the handling of the resource reservation process. The specific handling process is as shown in FIG. 7, which includes:

(701) The CPE initiates a resource reservation request to the transmission layer function entity for the service flow.

(702) The PE-FE on the transmission layer function entity finds the exact PD-FE according to the maintained corresponding relationships between PD-FEs and the authorization information of the service flows.

(703) The PE-FE initiates a resource reservation request to the selected PD-FE.

The PD-FE performs subsequent processing on the request.

Figure 8:
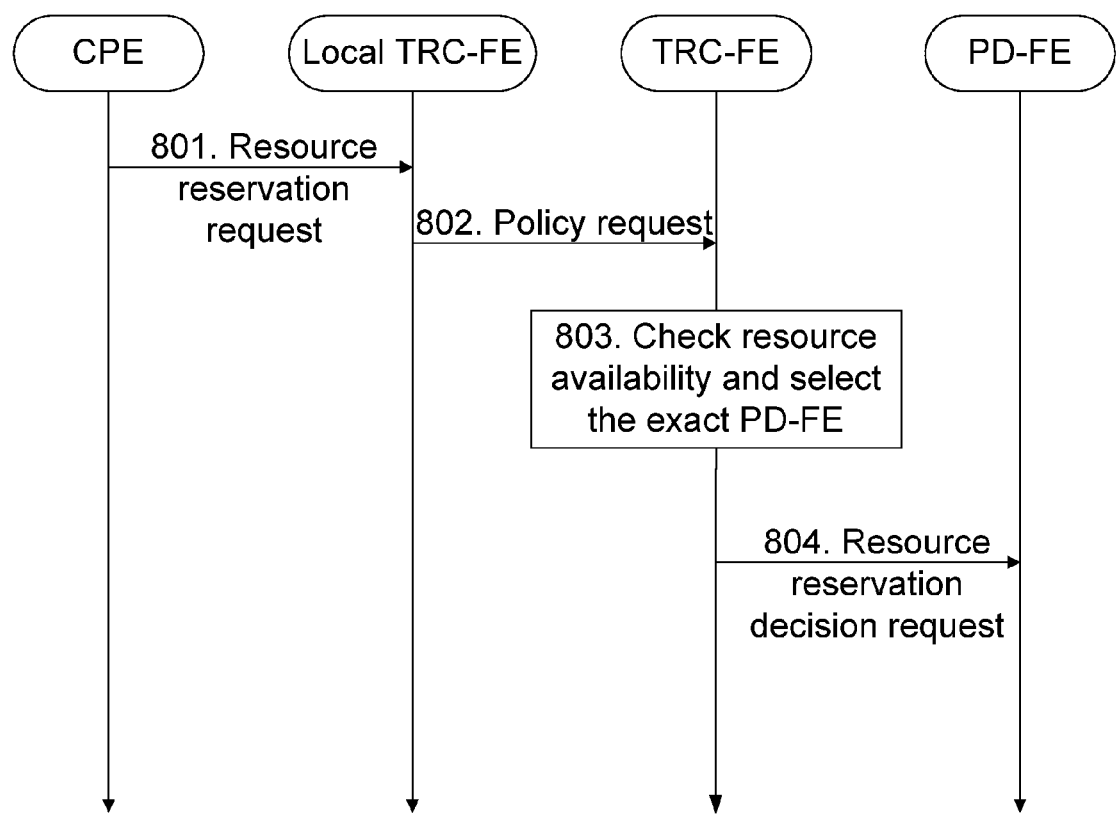
FIG. 8 is an illustration of the resource reservation handling process that CPE activates through the local TRC-FE according to the embodiment in FIG. 6.

If it is the resource reservation method activated through a TRC-FE, the TRC-FE can look up the maintained table of corresponding relationships between PD-FEs and the authorization information of the service flows to find the exact PD-FE, then it can implement the handling of the resource reservation process. The specific handling process is as shown in FIG. 8, which includes:

(801) The CPE initiates a resource reservation request to the transmission layer function entity for the service flow.

(802) The transmission layer function entity initiates a policy request to the carrier control layer TRC-FE through the local TRC-FE.

(803) The carrier control layer TRC-FE checks the availability of resources, and finds the exact PD-FE according to the maintained corresponding relationships between is PD-FEs and the authorization information of the service flows.

(804) The carrier control layer TRC-FE initiates a resource reservation request to the selected PD-FE.

The PD-FE performs subsequent processing on the request.

The above mentioned authorization information can be any information that is associated with the authorized service flow. Its purpose is to inform the TRC-FEs and/or PE-FEs about which service flows have got the authorization, while these service flows that have got the authorization may appear in the subsequent resource reservation request process, and it would suffice as long as TRC-FEs and PE-FEs can establish the corresponding relationship between the PD-FE and the authorized service flow according to the authorization information. For example, the corresponding relationship between the PD-FE and the authorized service flow may have the following implementation methods:

Optional implementation method 1 is:

The PD-FE adopts the quintuple method to bundle the service flows and the sessions, so that after performing authorization for the service request, the PD-FE will inform the quintuple information of the authorized service flow to the PE-FEs and the carrier control layer TRC-FEs, where the PE-FEs and the carrier control layer TRC-FEs maintain the table of corresponding relationships between the PD-FEs and the quintuple information.

When subsequently receiving a resource reservation request of the transmission layer, the PE-FEs or carrier control layer TRC-FEs can simply select the exact PD-FE according to the table of corresponding relationship by merely using the quintuple information of service flow in the resource reservation request.

Optional implementation method 2 is:

The PD-FE adopts the authorization token method to bundle the service flows and sessions. The operator must ensure that any PD-FE should assign a unique is authorization token to each authorized service flow. The PD-FE informs the authorized authorization tokens to the PE-FEs and the carrier control layer TRC-FEs after authorization. The PE-FEs and the carrier control layer TRC-FEs maintain the table of corresponding relationships between the PD-FEs and the authorization tokens.

When subsequently receiving the resource reservation request of the transmission layer, the PE-FEs or the carrier control layer TRC-FEs may simply select the exact PD-FE according to the authorization token in the request and the table of corresponding relationships.

Embodiment 2

Figure 9:
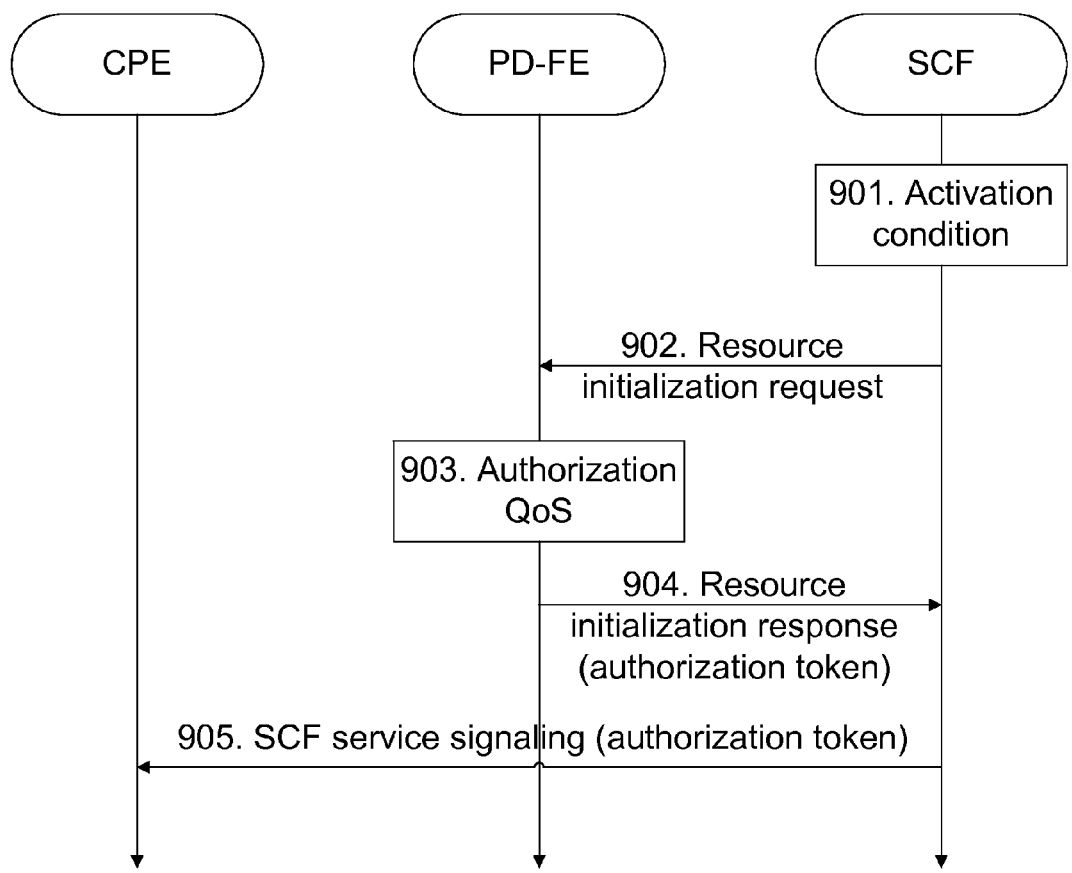
FIG. 9 is an illustration of the authorization process in the PULL mode according to another embodiment of the present invention.

As shown in FIG. 9, the service authorization process of this embodiment includes the following steps:

(901) The SCF activates the QoS authorization process after receiving the service establishment signaling message.

(902) The SCF requests an authorization for the service by sending a resource initialization request message to a PD-FE.

(903) The PD-FE performs the QoS resource authorization for the service request and assigns an authorization token to the session, which contains the identification information of PD-FE.

The above mentioned PD-FE identification information can be the IP address, or ID, etc, of the PD-FE, for example, an authorization token may comprise of the IP address of the PD-FE plus the serial number of a service flow. If the identification information contains no IP address of the PD-FE, then it is necessary to configure a table of mapping relationships between the identification information of the PD-FEs and the IP addresses of the PD-FEs on the PE-FEs and the carrier control layer TRC-FEs in advance.

(904) The PD-FE replies a resource initialization response to the SCF, and the response carries the authorization token.

(905) The SCF continues service signaling negotiation with a CPE, and the SCF returns the authorization token to the CPE through a signaling.

In this embodiment, during the authorization process, the PD-FE does not have to inform the authorization token of the authorized service flow to the PE-FEs and the carrier control layer TRC-FEs. During the resource reservation process, when the PE-FE receives a resource reservation request from the CPE or when the carrier control layer TRC-FEs subsequently receive a resource reservation request of the transmission layer (sent by the transmission layer TRC-FE), the PE-FEs or the carrier control layer TRC-FEs can easily select the exact PD-FE according to the identification of the PD-FE which is simply extracted from the authorization token.

Of course, the present invention may also have many other embodiments; without departing from the spirit and nature of the present invention, the person skilled in the art can make various kinds of relevant modification and variations based on the present invention, but these relevant modification and variations shall all fall within the scope of protection of the claims attached with the present invention.

INDUSTRIAL APPLICABILITY

The method for resource and admission control of the present invention enables PE-FE or TRC-FE to select to implement the process of resource reservation request for the PD-FE authorized by the service flow that initiates the resource reservation request, after receiving the resource reservation request of the service flow.

What is claimed is:

1. A method for resource and admission control, wherein there are a plurality of policy decision function entities (PD-FEs) in a network, the method including the following steps:
    during a process of service authorization of resource and admission control in a PULL mode, performing, by one of the PD-FEs, QoS resource authorization for a service request, then informing, by the PD-FE, an authorization information of an authorized service flow to a Policy Execute Function Entity (PE-FE);
    after the PE-FE receives the authorization information, establishing the association relationship between the PD-FE and the authorization information of the authorized service flow; and
    during the process of resource reservation of the authorized service flow initiated by a Customer Premises Equipment, selecting, by the PE-FE, the PD-FE according to the above mentioned corresponding relationship, and interacting with the PD-FE.

2. The method according to claim 1, wherein,
    the PD-FE adopts a quintuple method to bundle a service flow and a session, and the authorization information of the service flow sent down by the PD-FE is a quintuple information of the authorized service flow; and
    after the PE-FE receives the authorization information, the corresponding relationship between the quintuple information of the authorized service flow and the PD-FE is established, and a corresponding PD-FE is selected during the resource reservation process according to the quintuple information of the authorized service flow in the resource reservation request sent by the Customer Premises Equipment.

3. The method according to claim 1, wherein,
    the PD-FE assigns a unique authorization token to each authorized service flow and ultimately sends the authorization token to the Customer Premises Equipment, and the authorization information is an authorization token of the authorized service flow; and
    after receiving the authorization information, the PE-FE establishes the corresponding relationship between the authorized service flow and the PD-FE according to the authorization token, and selects the corresponding PD-FE during the resource reservation process according to the authorization token in the resource reservation request sent by the Customer Premises Equipment.

4. A method for resource and admission control, wherein there are a plurality of policy decision function entities (PD-FEs) in a network, the method including the following steps:
    during a process of service authorization of resource and admission control in a PULL mode, performing, by one of the PD-FEs, authorization for a service request, then informing, by the PD-FE, an authorization information of an authorized service flow to a Transport Resource Control Function Entity (TRC-FE);
    after the TRC-FE receives the authorization information, establishing a corresponding relationship between the PD-FE and the authorization information of the authorized service flow; and
    during a process of resource reservation of the authorized service flow initiated by a Customer Premises Equipment, selecting, by the TRC-FE, the PD-FE according to the above mentioned corresponding relationship, and interacting with the PD-FE.

5. The method according to claim 4, wherein,
    the PD-FE adopts a quintuple method to bundle a service flow and a session, and the authorization information of the service flow sent down by the PD-FE is the quintuple information of the authorized service flow; and
    after the TRC-FE receives the authorization information of the service flow, the corresponding relationship between the quintuple information of the authorized service flow and the PD-FE is established, and a corresponding PD-FE is selected during the resource reservation process according to the quintuple information of the authorized service flow in the resource reservation request sent by the Customer Premises Equipment.

6. The method according to claim 4, wherein,
    the PD-FE assigns a unique authorization token to each authorized service flow and ultimately sends the authorization token to the Customer Premises Equipment, and the authorization information is an authorization token of the authorized service flow; and
    after receiving the authorization information, the TRC-FE may establish the corresponding relationship between the authorized service flow and the PD-FE according to the authorization token, and select the corresponding PD-FE during the resource reservation process according to the authorization token in the resource reservation request sent by the Customer Premises Equipment.

7. The method according to claim 4, wherein,
    the TRC-FE is a carrier control layer TRC-FE; and the process of resource reservation includes:
    the Customer Premises Equipment initiates a resource reservation request to a transmission layer function entity for the service flow;
    the transmission layer function entity initiates a policy request to the carrier control layer TRC-FE through a local TRC-FE; and
    the carrier control layer TRC-FE checks the availability of resources, selects the PD-FE according to the corresponding relationship between the PD-FE and the authorization information, and initiates a resource reservation request to the PD-FE.

8. A method for resource and admission control, wherein there are a plurality of policy decision function entities (PD-FEs) in a network, the method including the following steps:
    during a process of service authorization of resource and admission control in a PULL mode, including, by one of the PD-FEs, its own identification information into an authorization token assigned to an authorized service flow, and ultimately sending, by the PD-FE, the authorization token to a Customer Premises Equipment; and
    during the process of resource reservation of the authorized service flow initiated by the Customer Premises Equipment, after receiving a resource reservation request, selecting, by a Policy Execute Function Entity (PE-FE), the PD-FE according to the identification information of the PD-FE in an authorization token of the resource reservation request, and interacting with the PD-FE.

9. The method according to claim 8, wherein,
    the identification information of the PD-FE contains an IP address of the PD-FE; or
    the identification information of the PD-FE contains no IP address of the PD-FE, but a table of mapping relationships between identification information of PD-FEs and their IP addresses is configured over the PE-FE.

10. A method for resource and admission control, wherein there are a plurality of policy decision function entities (PD-FEs) in a network, the method including the following steps:

during a process of service authorization of resource and admission control in a PULL mode, including, by one of the PD-FEs, its own identification information into an authorization token assigned to an authorized service flow, and ultimately sending, by the PD-FE, the authorization token to a Customer Premises Equipment; and during a process of resource reservation of the authorized service flow initiated by the Customer Premises Equipment, after receiving a resource reservation request, selecting, by a Transport Resource Control Function Entity (TRC-FE), the PD-FE according to the identification information of the PD-FE in an authorization token of the resource reservation request, and interacting with the PD-FE.

11. The method according to claim 10, wherein, the identification information of the PD-FE is an IP address of the PD-FE; or the identification information of the PD-FE contains no IP address of the PD-FE, but a table of mapping relationships between identification information of PD-FEs and their IP addresses is configured over the TRC-FE.

12. The method according to claim 10, wherein, the TRC-FE is a carrier control layer TRC-FE; during the process of resource reservation, after receiving the resource reservation request sent by the transmission layer, the carrier control layer TRC-FE selects the PD-FE according to the identification information of the PD-FE in the authorization token of the resource reservation request, and interacts with the PD-FE.

13. The method according to claim 5, wherein, the TRC-FE is a carrier control layer TRC-FE; and the process of resource reservation includes:

the Customer Premises Equipment initiates a resource reservation request to a transmission layer function entity for the service flow;

the transmission layer function entity initiates a policy request to the carrier control layer TRC-FE through a local TRC-FE; and the carrier control layer TRC-FE checks the availability of resources, selects the PD-FE according to the corresponding relationship between the PD-FE and the authorization information, and initiates a resource reservation request to the PD-FE.

14. The method according to claim 6, wherein, the TRC-FE is a carrier control layer TRC-FE; and the process of resource reservation includes:

the Customer Premises Equipment initiates a resource reservation request to a transmission layer function entity for the service flow;

the transmission layer function entity initiates a policy request to the carrier control layer TRC-FE through a local TRC-FE; and the carrier control layer TRC-FE checks the availability of resources, selects the PD-FE according to the corresponding relationship between the PD-FE and the authorization information, and initiates a resource reservation request to the PD-FE.

15. The method according to claim 11, wherein, the TRC-FE is a carrier control layer TRC-FE; during the process of resource reservation, after receiving the resource reservation request sent by the transmission layer, the carrier control layer TRC-FE selects the PD-FE according to the identification information of the PD-FE in the authorization token of the resource reservation request, and interacts with the PD-FE.

* * * * *